No. 631,722. Patented Aug. 22, 1899.
J. M. JUNCA & D. P. J. BURGUIERES.
SUGAR CANE SCRAPER.
(Application filed June 12, 1899.)
(No Model.)
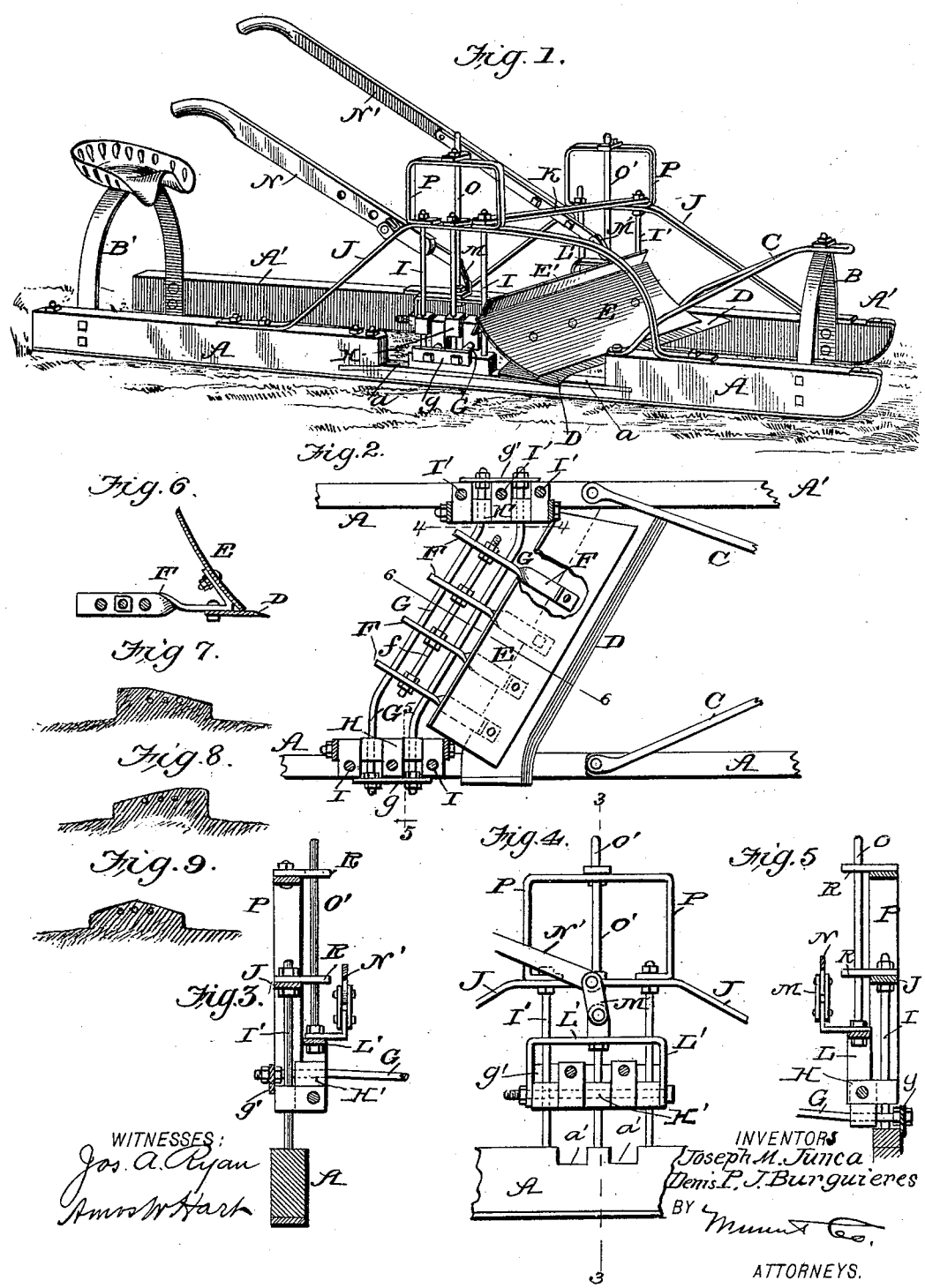
WITNESSES:
Jos. A. Ryan
Amos W. Hart
INVENTORS
Joseph M. Junca
Denis P. J. Burguieres
BY
ATTORNEYS.

UNITED STATES PATENT OFFICE.

JOSEPH M. JUNCA AND DENIS P. J. BURGUIERES, OF LOUISA, LOUISIANA.

SUGAR-CANE SCRAPER.

SPECIFICATION forming part of Letters Patent No. 631,722, dated August 22, 1899.

Application filed June 12, 1899. Serial No. 720,314. (No model.)

*To all whom it may concern:*

Be it known that we, JOSEPH M. JUNCA and DENIS P. J. BURGUIERES, citizens of the United States, residing at Louisa, in the parish of St. Mary's and State of Louisiana, have invented a new and useful Improvement in Sugar-Cane Scrapers, of which the following is a specification.

This invention is an improved machine for scraping sugar-cane—that is to say, for removing the surplus and compacted soil from the planted cane, as is commonly done in the most approved method of cane cultivation practiced in Louisiana.

The construction, combination, and operation of the machine are hereinafter set forth, reference being had to the accompanying drawings, in which—

Figure 1 is a perspective view of the complete machine. Fig. 2 is a horizontal section on line 2 2 of Fig. 1. Fig. 3 is a vertical section on line 3 3 of Fig. 4. Fig. 4 is a vertical section on line 4 4 of Fig. 2. Fig. 5 is a vertical section on line 5 5 of Fig. 2. Fig. 6 is a transverse section on line 6 6 of Fig. 2. Figs. 7, 8, and 9 are vertical sections of the soil, illustrating the approved method of cultivating sugar-cane.

A A' indicate two parallel wooden runners which are shod with strap iron or steel. These runners are rigidly connected and held duly spaced apart chiefly by means of two metal arches B B', arranged at their respective ends. The rear one, B', supports the driver's seat and the front one, B, supports draft-rods C, to which the team is attached (in practice) and which further connect and brace the runners A A'.

The cane cutting, scraping, and shaving apparatus, together with the means for adjusting the same higher or lower, is arranged just forward of the middle of the runners A A'. The knife, cutter, or scraper D is arranged flat and nearly horizontal, and the moldboard E rests thereon and is curved upward and rearward. The upward extension E' of the moldboard is arranged at an angle to the latter, E. Both the knife D and moldboard E are inclined forward or placed oblique to the runners A A', so as to enable the knife to make a draw cut and to cause the soil, stubble, and trash taken up by the knife to be discharged at one side of the machine.

A considerable portion of the runner A is cut out, as shown at $a$, Fig. 1, to accommodate the cutter and apparatus connected with it, while the other runner A' is also cut out at two places $a'$, Fig. 4, and to a less depth. The knife or cutter D is rigidly attached by means of a series of flat twisted bars F (see Figs. 2 and 5) to two transverse angular rods that pass through the rear ends of said bars F and are arranged horizontally. These bars are rigidly connected and spaced apart by means of a rod $f$, (see Fig. 2,) which is arranged intermediately of the rods G. The ends of said rods G enter holes in pivoted blocks H, arranged adjustably on vertical standards or uprights I I', that are fixed to the respective runners A A'. That is to say, three uprights, consisting of stout iron rods, are fixed on each runner in a plane parallel thereto and spaced apart, as shown. The upper ends of the standards are connected by curved braces J, which extend to the front and rear and are bolted to the runners. A transverse tie-bar K, Fig. 1, further connects and braces the standards.

Each series of blocks I and I' is pivoted upon a horizontal rod forming part of the respective hangers L L', whose upper portion is in the form of an inverted stirrup and connected by a pivoted link M or M' with the respective hand-levers N N'. The latter are pivoted on the curved braces J, as shown in Fig. 1. It will be seen that three of the sets of blocks H are adapted to slide on the standards I and three of the other set H' on the opposite set of standards I', while the crossbars G pass through two blocks of each set H and H', which are pivoted in the respective hangers L and L'. It is apparent that each set of blocks thus pivoted is adapted to rock independently, and thereby each hanger L or L' may be raised or lowered independently of the other by its connecting-lever N or N'. Hence the knife D and moldboard E may be raised or lowered at either end without like movement of the other end. This obviously permits the horizontal angle of the knife and moldboard to be adjusted to any degree required for cutting and scraping the soil from the cane at an inclination to the furrow.

From inspection of Figs. 1, 3, and 5 it will be noted that the rods G pass through the lower portions of blocks H and through the upper portion of blocks H', and hence the knife is held normally inclined horizontally. This inclination is further provided for by the difference of depth to which the runners are cut out at $a$ $a'$ to accommodate the respective sets of blocks H and H'. A plate $g$ is attached to and connects the rods G at one end and a similar plate $g'$ at the other end.

As a means for guiding the hangers L and L' vertically we employ the rods O O', which slide in guides P, bolted to the braces J. The said rods O O' are rigidly secured to the respective hangers L L' by means of screw-nuts.

Having now sufficiently described the construction of our machine, we will briefly indicate its practical application in the cultivation of cane.

According to the method of cane cultivation generally adopted in the State of Louisiana the ridge in which the cane is planted is first barred off on each side by means of a plow, so that the ridge left standing has straight or vertical parallel sides. The earth thus removed from the sides of the ridge is thrown laterally into the furrow, where it remains. The ridge is now ready to be scraped. By the old method this is done entirely by manual labor, the laborer using a hoe, by means of which he cut away the top of the ridge, so that it assumed the form shown in Fig. 9. In using our invention the machine above described is drawn along the ridge and in its first operation removes one side or edge thereof, as shown in Fig. 7, and when drawn back over the said ridge it removes the opposite or corresponding edge, as shown in Fig. 8, and thus the ridge is caused to present the obtuse angle in cross-section which is shown in Fig. 9. This operation removes the compacted and surplus depth of soil, so that the cane becomes more readily affected by the heat of the sun, thus causing it to sprout out quickly.

Having thus described our invention, what we claim, and desire to secure by Letters Patent, is—

1. The combination with runners having cut-out portions or spaces which differ in depth in the respective runners, of a knife or scraper and moldboard which are normally inclined to both the horizontal and vertical as well as rearward, substantially as shown and described.

2. The combination with runners, of a knife or cutter, transverse rods supporting the latter, pivoted or hinged supports for each end of the said bars, and means for adjusting the knife vertically at each end, independently of the other, substantially as shown and described.

3. The combination with runners, of a knife or cutter, transverse rods supporting the latter, hangers arranged on each side, blocks pivoted thereon and receiving the ends of the aforesaid rods, vertical guides for said hangers, and levers for adjusting the hangers higher or lower, for the purpose of varying the position of the knife with relation to the ground surface, substantially as shown and described.

4. The combination, with runners or other form of support adapted to travel in the furrow, of a knife or cutter arranged transversely, bars for supporting the same, devices with which the ends of said bars are connected, vertical guides upon which said devices are adapted to slide, and pivoted hand-levers which are loosely connected with said devices, for the purpose of adjusting the knife vertically, substantially as shown and described.

5. The combination, with the runners, and a knife arranged transversely, of supporting-bars therefor, pivoted supports with which the ends of such bars are connected, a hanger on which the said supports are adapted to rock, vertical guides for such supports, and means for adjusting the latter higher or lower, and together or independently, substantially as shown and described.

6. The combination, with the runners, or other form of support, of a knife or scraper arranged transversely and one end thereof lying in a slot, or cut-out portion, of one of said runners, whereby it is normally lower than the opposite end, transverse bars supporting said knife or scraper, pivoted hangers in which these bars are held, the same being arranged in connection with means for vertical adjustment; vertical guides on which the hangers run; brackets or braces attached to the runners, and vertically-sliding guide-bars O and O', which work in suitable guides fixed on said braces, substantially as shown and described.

JOSEPH M. JUNCA.
DENIS P. J. BURGUIERES.

Witnesses:
 NUMA S. BERGERON,
 VERNON S. CONNER.